(12) United States Patent
Smoke et al.

(10) Patent No.: US 8,616,832 B2
(45) Date of Patent: Dec. 31, 2013

(54) TURBINE ASSEMBLIES WITH IMPINGEMENT COOLING

(75) Inventors: Jason Smoke, Phoenix, AZ (US); Bradley Reed Tucker, Chandler, AZ (US); Bob Mitlin, Scottsdale, AZ (US); Dan Crites, Mesa, AZ (US); Rajiv Rana, Phoenix, AZ (US); Alexander MirzaMoghadam, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 1064 days.

(21) Appl. No.: 12/627,609

(22) Filed: Nov. 30, 2009

(65) Prior Publication Data

US 2011/0129342 A1    Jun. 2, 2011

(51) Int. Cl.
  *F01D 5/14*    (2006.01)
(52) U.S. Cl.
  USPC .................. 415/115; 416/193 A; 416/220 R
(58) Field of Classification Search
  USPC ........ 415/115, 116; 416/193 A, 193 R, 220 R
  See application file for complete search history.

(56) References Cited

U.S. PATENT DOCUMENTS

| | | | |
|---|---|---|---|
| 3,945,758 A * | 3/1976 | Lee | ................................. 415/144 |
| 4,523,890 A | 6/1985 | Thompson | |
| 4,923,370 A | 5/1990 | Larson et al. | |
| 5,232,335 A | 8/1993 | Narayana et al. | |
| 5,685,158 A | 11/1997 | Lenahan et al. | |
| 5,755,556 A | 5/1998 | Hultgren et al. | |
| 6,217,279 B1 | 4/2001 | Ai et al. | |
| 6,276,896 B1 | 8/2001 | Burge et al. | |
| 6,416,282 B1 | 7/2002 | Beeck et al. | |
| 6,481,959 B1 | 11/2002 | Morris et al. | |
| 6,575,704 B1 | 6/2003 | Tiemann | |
| 7,017,349 B2 | 3/2006 | Laurello et al. | |
| 7,037,067 B2 * | 5/2006 | Okita et al. | ................... 415/115 |
| 7,114,339 B2 | 10/2006 | Alvanos et al. | |
| 7,484,936 B2 | 2/2009 | Bouchard et al. | |
| 7,566,201 B2 | 7/2009 | Brillert et al. | |
| 2009/0169360 A1 | 7/2009 | Brommer et al. | |

* cited by examiner

*Primary Examiner* — Dwayne J White
(74) *Attorney, Agent, or Firm* — Ingrassia Fisher & Lorenz, P.C.

(57) ABSTRACT

A gas turbine engine assembly includes a housing including an annular duct wall that at least partially defines a mainstream hot gas flow path; a stator assembly with a stator vane extending into the mainstream gas flow; and a turbine rotor assembly upstream of the stator assembly and defining a turbine cavity with the stator assembly. The turbine rotor assembly includes a rotor disk having a forward side and an aft side, a rotor platform positioned on a periphery of the rotor disk, the rotor platform defining an aft flow discourager, a rotor blade mounted on the rotor platform extending into the mainstream gas flow, and an aft seal plate mounted on the aft side of the rotor disk. The aft seal plate has a radius such that the aft seal plate protects the rotor disk from hot gas ingestion.

20 Claims, 3 Drawing Sheets

TURBINE ASSEMBLIES WITH IMPINGEMENT COOLING

STATEMENT REGARDING FEDERALLY SPONSORED RESEARCH OR DEVELOPMENT

This invention was made with Government support under Contract No. W911W6-08-2-0001 awarded by the US Army. The Government has certain rights in this invention.

TECHNICAL FIELD

The present invention generally relates to gas turbine engine assemblies, and more particularly relates to turbine assemblies with improved cooling characteristics.

BACKGROUND

A gas turbine engine may be used to power various types of vehicles and systems. A particular type of gas turbine engine that may be used to power aircraft is a turbofan gas turbine engine. A turbofan gas turbine engine conventionally includes, for example, five major sections: a fan section, a compressor section, a combustor section, a turbine section, and an exhaust section. The fan section is typically positioned at the inlet section of the engine and includes a fan that induces air from the surrounding environment into the engine and accelerates a fraction of this air toward the compressor section. The remaining fraction of air induced into the fan section is accelerated into and through a bypass plenum and out the exhaust section.

The compressor section raises the pressure of the air it receives from the fan section, and the resulting compressed air then enters the combustor section, where a ring of fuel nozzles injects a steady stream of fuel into a combustion chamber formed between inner and outer liners. The fuel and air mixture is ignited to form combustion gases, which drive rotors in the turbine section for power extraction. The gases then exit the engine at the exhaust section.

In a typical configuration, the turbine section includes rows of stator vanes and rotor blades disposed in an alternating sequence along the axial length of a generally annular hot gas flow path. The rotor blades are mounted at the periphery of one or more rotor disks that are coupled in turn to a main engine shaft.

In most gas turbine engine applications, it is desirable to regulate the operating temperature of certain engine components in order to prevent overheating and potential mechanical failures attributable thereto. As such, most turbine components, particularly the stator vane and rotor blade assemblies may benefit from temperature management in view of the high temperature environment of the mainstream hot gas flow path. Accordingly, in many turbine sections, the volumetric space disposed radially inwardly or internally from the hot gas flow path includes an internal cavity through which a cooling air flow is provided. The cooling of the internal engine cavity attempts to maintain the temperatures of the rotor disks and other internal engine components that are suitable for their material and stress level.

However, in many conventional engines, relatively high levels of cooling air flows have been used to obtain satisfactory temperature control of the components within the internal engine cavity. In addition, the demand for cooling flow may be impacted by an irregular and unpredictable ingestion of mainstream hot gases from the hot gas flow path into the internal engine cavity. Various attempts to prevent hot gas ingestion between adjacent stator vanes and rotor blades have primarily involved the use of overlapping lip-type structures in close running clearance, often referred to as flow discouragers, but these structures have not been as effective as desired. Moreover, it is generally desirable to employ mechanisms to minimize this cooling air since air from the compressor used for cooling is not available for combustion. Additionally, temperature control of the flow discouragers should also be considered. If the flow discouragers are exposed to undesirably high temperatures, they may deform, which may impact their primary functions.

Accordingly, it is desirable to provide an improved gas turbine engine assembly that maintains proper temperature control. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a gas turbine engine assembly includes a housing including an annular duct wall that at least partially defines a mainstream hot gas flow path configured to receive mainstream hot gas flow; a stator assembly comprising a stator vane extending into the mainstream gas flow; and a turbine rotor assembly upstream of the stator assembly and defining a turbine cavity with the stator assembly. The turbine rotor assembly includes a rotor disk having a forward side and an aft side, a rotor platform positioned on a periphery of the rotor disk, the rotor platform defining an aft flow discourager, a rotor blade mounted on the rotor platform extending into the mainstream gas flow, and an aft seal plate mounted on the aft side of the rotor disk. The aft seal plate has a radius such that the aft seal plate protects the rotor platform from hot gas ingestion of the mainstream hot gas flow path into the turbine cavity.

In accordance with another exemplary embodiment, a turbine assembly is provided for a gas turbine engine assembly defining a mainstream hot gas flow path that receives mainstream hot gas flow. The assembly includes a rotor disk having a forward side, an aft side, and a circumferential periphery, a rotor platform positioned on the periphery of the rotor disk, the rotor platform defining an aft flow discourager, a rotor blade mounted on the rotor platform extending into the mainstream gas flow, and an aft seal plate mounted on the aft side of the rotor disk. The aft seal plate defines at least one cooling channel configured to deliver cooling flow to the aft flow discourager.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein include gas turbine engine assemblies that maintain suitable temperatures and reduce or eliminate of the effects of hot gas ingestion. More particularly, exemplary gas turbine engine assemblies include a turbine rotor assembly with an aft flow discourager. An aft seal plate may be configured to cooperate with the aft flow discourager to protect the rotor disk components, including the aft flow discourager, from elevated temperatures and conditions. Additionally, the aft seal plate may have channels that deliver impingement cooling flow to the aft flow discourager.

Figure 1:
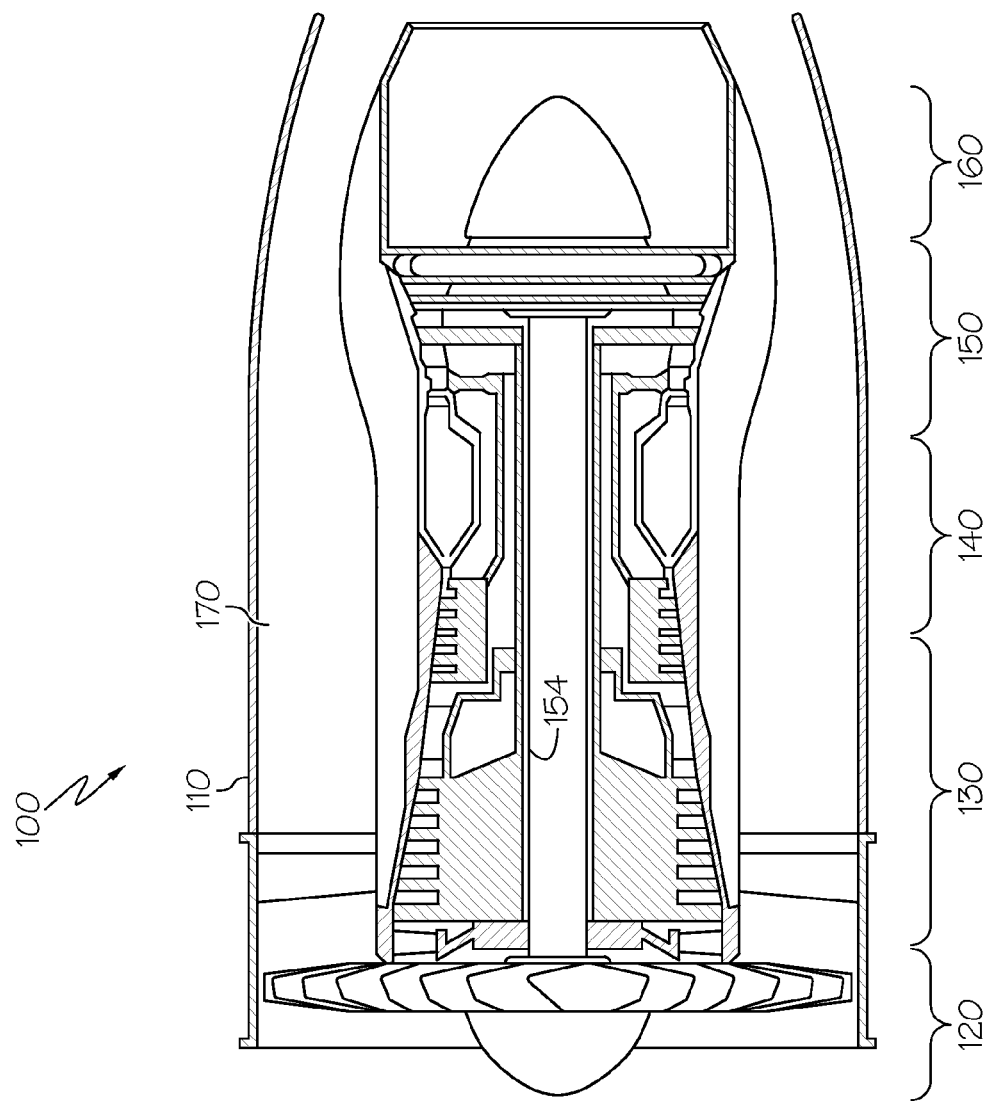
FIG. 1 is a partial cross-sectional view of a gas turbine engine in accordance with an exemplary embodiment.

FIG. 1 is a cross-sectional view of a gas turbine engine 100, according to an exemplary embodiment. In general, exemplary embodiments discussed herein may be applicable to any type of engines, including turboshaft engines. The gas turbine engine 100 can form part of, for example, an auxiliary power unit for an aircraft or a propulsion system for an aircraft. The gas turbine engine 100 has an overall construction and operation that is generally understood by persons skilled in the art. The gas turbine engine 100 may be disposed in an engine case 110 and may include a fan section 120, a compressor section 130, a combustion section 140, a turbine section 150, and an exhaust section 160. The fan section 120 may include a fan, which draws in and accelerates air. A fraction of the accelerated air exhausted from the fan section 120 is directed through a bypass section 170 to provide a forward thrust. The remaining fraction of air exhausted from the fan is directed into the compressor section 130.

The compressor section 130 may include a series of compressors that raise the pressure of the air directed into it from the fan. The compressors may direct the compressed air into the combustion section 140. In the combustion section 140, the high pressure air is mixed with fuel and combusted. The combusted air is then directed into the turbine section 150.

As described in further detail below, the turbine section 150 may include a series of rotor and stator assemblies disposed in axial flow series. The combusted air from the combustion section 140 expands through the rotor and stator assemblies and causes the rotor assemblies to rotate a main engine shaft for energy extraction. The air is then exhausted through a propulsion nozzle disposed in the exhaust section 160 to provide additional forward thrust.

Figure 2:
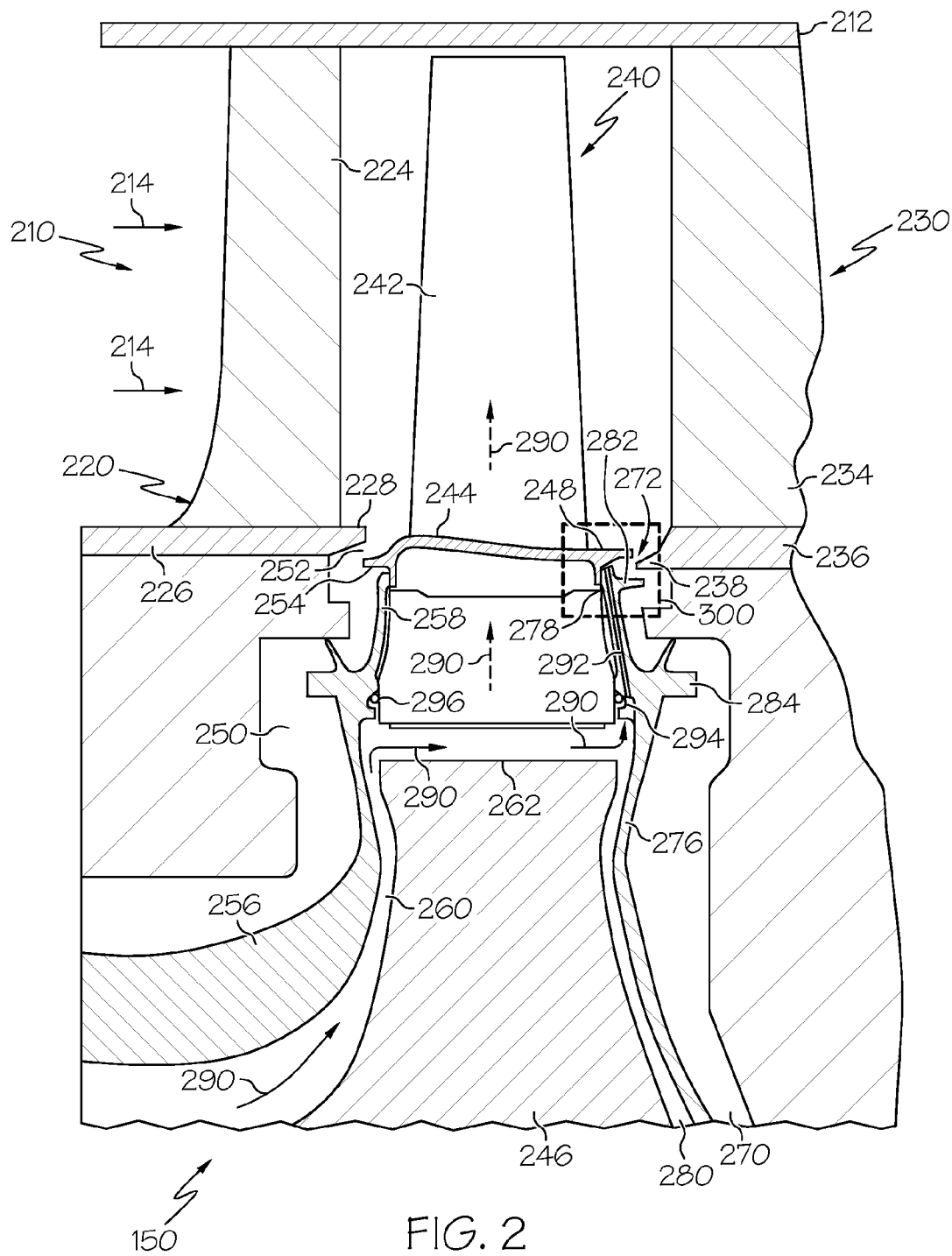
FIG. 2 is a partial cross-sectional view of a turbine section of the gas turbine engine of FIG. 1 in accordance with an exemplary embodiment.

FIG. 2 is a partial cross-sectional view of a turbine assembly such as the turbine section 150 of the gas turbine engine 100 of FIG. 1 in accordance with an exemplary embodiment. In general terms, the turbine section 150 includes a mainstream flow path 210 defined in part by an annular duct wall 212 for receiving mainstream hot gas flow 214 from the combustion section 140 (FIG. 1).

Figure 3:
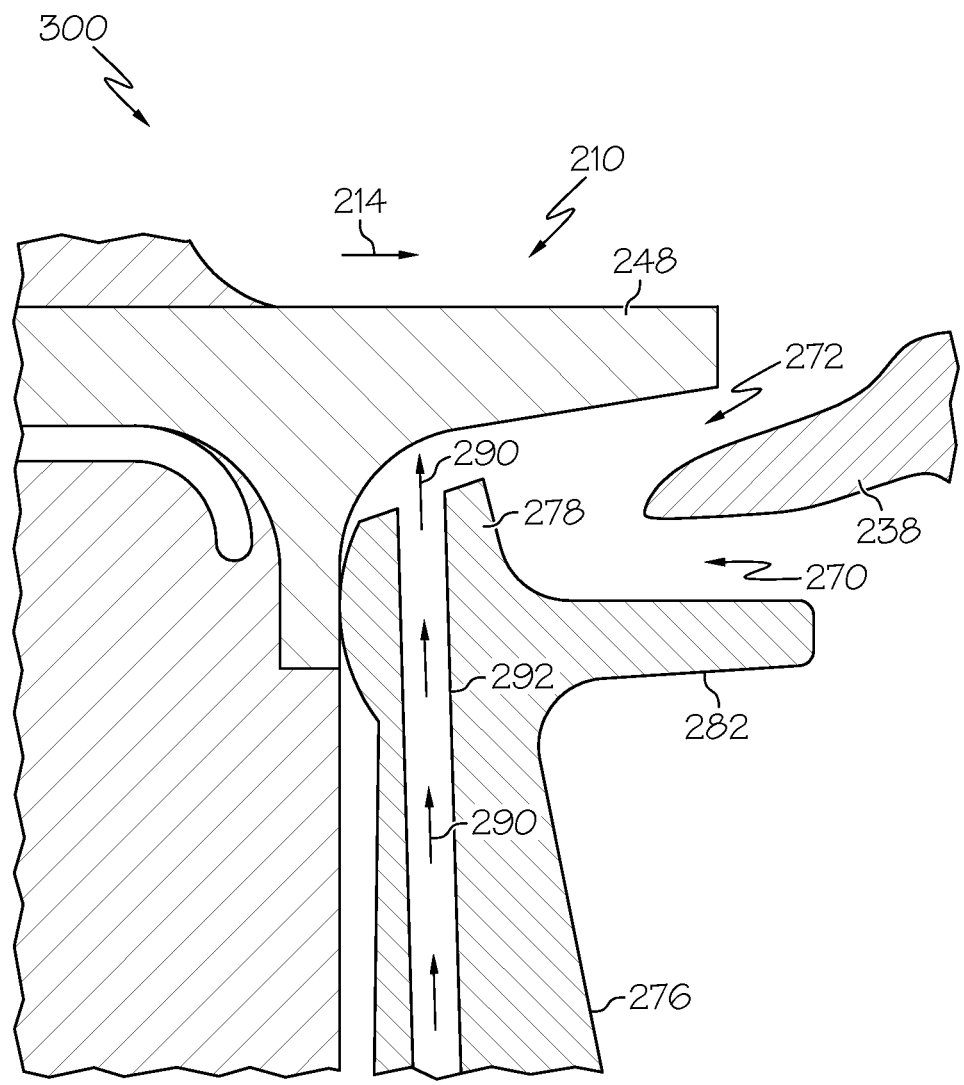
FIG. 3 is an enlarged cross-sectional view of a portion of the turbine section of FIG. 2.

The turbine section 150 includes an alternating sequence of stator assemblies 220, 230 and rotor assemblies 240. In the view of FIG. 3, first and second stator assemblies 220, 230 and one rotor assembly 240 are shown. The first and second stator assemblies will be referred to as "forward" and "aft" stator assemblies based on their relative orientation with respect to the illustrated rotor assembly 240. In general, any number of stator and rotor assemblies 220, 230, 240 may be provided. As discussed in greater detail below, the mainstream hot gas flow 214 flows past the stator and rotor assemblies 220, 230, 240.

The forward stator assembly 220 is formed by stator vanes 224 extending radially outward from a platform 226 to the wall 212, and the aft stator assembly 230 is similarly formed by stator vanes 234 extending radially outward from a platform 236 to the wall 212. The platforms 226, 236 can be directly mounted to the combustor (not shown), or coupled to the combustor through intervening components, to form a portion of the mainstream flow path 210 with the wall 212.

The rotor assembly 240 is formed by turbine rotor blades 242 projecting radially outwardly from a circumferential rotor platform 244 mounted on the periphery of a rotor disk 246, which in turn circumscribes a main engine shaft (not shown). During operation, the mainstream hot gas flow 214 drives the rotor blades 242 and the associated rotor assembly 240 for power extraction, while the stator assemblies 220 are generally stationary.

Turbine rotor cavities 250, 270 are formed between the stator assemblies 220, 230 and the rotor assembly 240. In the depicted embodiment, the disk cavities 250, 270 will be referred to as a forward rotor cavity 250 and an aft rotor cavity 270 based on the position of the rotor assembly 240. A forward gap 252 is formed between the mainstream flow path 210 and the forward rotor cavity 250, and an aft gap 272 is formed between the mainstream flow path 210 and the aft rotor cavity 270. As discussed in further detail below, a portion of the mainstream hot gas flow 214 may attempt to flow through the gaps 252, 272 during operation. If unaddressed, the elevated temperatures of the mainstream hot gas flow 214 may adversely affect certain components in the rotor cavities 250, 270.

Various mechanisms of the turbine section 150 attempt to prevent, reduce, or mitigate the effects of the mainstream gas ingestion. For example, in the depicted exemplary embodiment, the forward gap 252 is defined by a stationary flow discourager 228 extending downstream from the platform 226 of the stator assembly 220 and a forward rotor flow discourager 254 extending upstream from the turbine platform 244. Generally, the stationary flow discourager 228 and the forward rotor flow discourager 254 overlap one another such that the mainstream hot gas flow 214 flows over the discouragers 228, 254 and stays in the mainstream flow path 210 instead of flowing through the forward gap 252 into the forward rotor cavity 250. Similarly, the forward gap 272 is defined by an aft rotor flow discourager 248 extending downstream from the platform 244 of the rotor assembly 240 and a forward stationary flow discourager 238 extending upstream from the stator platform 236. Generally, the aft rotor flow discourager 248 and the stationary flow discourager 238 overlap one another such that the mainstream hot gas flow 214 flows over the flow discouragers 248, 238 and stays in the mainstream flow path 210 instead of flowing through the aft gap 272 into the aft rotor cavity 270.

The rotor assembly 240 further includes a forward seal plate 256 that is generally concentric with the rotor disk 246 and is mounted on and rotates with a forward face of the rotor disk 246. The forward seal plate 256 generally has a radius such that a peripheral portion 258 extends adjacent to the forward rotor flow discourager 254. The forward seal plate 256 may form a forward seal plate cavity 260 with the forward face of the rotor disk 246. The forward seal plate 256 cooperates with the stationary flow discourager 228 and forward rotor flow discourager 254 to prevent or inhibit hot gas ingestion. As discussed in greater detail below, the forward seal plate 256 also directs cooling air into the rotor disk 246.

The rotor assembly 240 further includes an aft seal plate 276 that is generally concentric with the rotor disk 246 and is mounted on and rotates with an aft face of the rotor disk 246. The aft seal plate 276 generally has a radius such that a peripheral portion 278 extends adjacent to the aft rotor flow discourager 248. The aft seal plate 276 may form an aft seal plate cavity 280 with the aft face of the rotor disk 246. As discussed in greater detail below, the aft seal plate 276 cooperates with the aft rotor flow discourager 248 and stationary flow discourager 238 to prevent, inhibit, or mitigate the effects of hot gas ingestion.

Additional temperature control mechanisms include cooling air 290 that flows through the rotor cavities 250, 270 and through the rotor assembly 240. In particular, the cooling air 290 may be obtained as bleed flow from a compressor or compressor section 130 (FIG. 1) and flows to the forward seal plate cavity 260 to assist in maintaining an appropriate temperature of the rotor disk 246 and forward seal plate 256. The cooling air 290 may additionally flow through a disk channel 262 in the rotor disk 246. A seal 296 may be provided between the forward seal plate 256 and the rotor disk 246 to minimize leakage between the aft seal plate cavity 280 and the disk channel 262. The disk channel 262 may be in fluid communication with internal passageways (not shown) through the rotor platform 244 and within the rotor blade 242. As such, during operation, the cooling air 290 is drawn through the rotor disk 246 and rotor blade 242 for cooling these components. In one embodiment, the cooling air 290 may form a cooling film on the surface of the rotor blade 242.

The cooling air 290 may additionally flow from the disk channel 262 to the aft seal plate cavity 280 to assist in maintaining an appropriate temperature of the rotor disk 246 and aft seal plate 276. As discussed in further detail below with reference to FIG. 3, the aft seal plate 276 defines a number of impingement cooling channels 292 that extend in a radial direction from the aft seal plate cavity 280. In general, a number of impingement cooling channels 292 may be arranged circumferentially around the aft seal plate 276. The impingement cooling channels 292 deliver the cooling air 290 to the underside of the platform 244, particularly the aft rotor flow discourager 248. A seal 294 may be provided to prevent leakage of the cooling air 290 and encourage flow into the impingement cooling channels 292. In further embodiments, the impingement cooling channels 292 may receive cooling air 290 directly from the disk channel 262 or an alternate source.

FIG. 3 is an enlarged cross-sectional view of a portion 300 of the turbine section 150 of FIG. 2. In particular, FIG. 3 illustrates the aft rotor flow discourager 248, the peripheral portion of the aft seal plate 276, and the impingement cooling channels 292.

As noted above, ingested gas from the mainstream hot gas flow 214 may attempt to flow through the aft gap 272 into the aft rotor cavity 270 or through the forward gap 252 and the rotor assembly 240 to the underside of the aft flow discourager 248. The aft seal plate 276 generally has an extended radius such that the peripheral portion 278 extends adjacent to the aft rotor flow discourager 248. The aft seal plate 276 generally prevents, inhibits, or mitigates the effects of hot gas ingestion in this area by limiting the exposure of the rotor disk 246, such as a majority or substantially all of the rotor disk 246. The extended aft seal plate 276 may also limit hot gas flowing through the forward gap 252 to the underside of the aft flow discourager 248. In general, the aft seal plate 276 is tucked under the aft flow discourager 248 as close as possible with consideration for manufacturing tolerances and relative radial deflections. For example, the aft seal plate 276 may have a radius that is at least 50% of the radius of the rotor disk 242. In other exemplary embodiments, the aft seal plate 276 may have a radius that is at least 90%, 95%, or 100% of the radius of the rotor disk 242. In one exemplary embodiment, the impingement gap (i.e., the gap between the aft seal plate 276 and the aft flow discourager 248) may be any suitable distance corresponding to the radius ratios discussed above. In other embodiments, the impingement gap may be a function of the diameter of the cooling channels 292. For example, the ratio of the impingement gap and the diameter of the cooling channel 292 may be about 2:1. In other embodiments, the ratio may be any suitable ratio, including about 1:1 to about 1:3. In conventional turbine assemblies, the aft seal plate does not extend to adjacent the turbine flow discourager.

As also noted above, the impingement cooling channels 292 deliver cooling air 290 that directly impinges upon and cools the aft rotor flow discourager 248. In conventional turbine assemblies, temperature control of the aft flow discourager is typically unaddressed, and as such, the aft flow discourager tends deform, particularly in a radially outward direction, which widens the gap and adversely affects the function of the flow discouragers. In general, the impingement cooling channels 292 are oriented such that the cooling air 290 strikes the aft rotor flow discourager 248 at an angle of approximately 90°, although other angles may be possible based on structural design and cooling requirements. In generally, the aft rotor flow discourager 248 is maintained at a temperature and stress combination such that little or no deformation of the discourager may occur. In general, the impingement cooling channels 292 may have a length/diameter ratio of approximately 2:1, although other ratios are possible such that satisfactory jets of cooling air 290 are established. In the depicted exemplary embodiment, the impingement cooling channel 292 extends past the seal 296 and cooling air is supplied from radially inward (i.e., below) the seal 296. In further exemplary embodiments, the cooling channel 292 does not extend past the seal 296 and cooling air is supplied via controlled leakage past the seal 292. The cooling air 290 from the impingement cooling channels 292 may also function as an ingestion inhibiting dynamic jet that assists in recirculating any ingested gas back into the mainstream flow path 210. In some embodiments, the impingement cooling channels 292 may enable the aft flow discourager 248 to be extended and/or the stationary flow discourager 238 to be shortened relative to conventional assemblies. In other embodiments, the lengths of the aft flow discourager 248 and the stationary flow discourager 238 are not modified.

Computational fluid dynamics (CFD) analysis may be used to determine the number, orientation, dimension, and position of the impingement cooling channels 292. In general, design of impingement cooling channels 292 may depend on factors including application and engine design. In one exemplary embodiment, the impingement cooling channels 292 are provided to maintain the aft flow discourager 248 to a suitable temperature. Considerations may include engine application, required heat extraction, stress analysis, the temperature and pressure of the cooling air, and convective cooling effectiveness. The impingement cooling channels 292 may be formed, for example, by EDM or STEM drilling.

The aft seal plate 276 may additionally include one or more axial flanges 282, 284 that provide additional support to the aft seal plate 276 during operation. Particularly, axial flanges 282, 284 are configured such that undesirable deflections do not occur as the aft seal plate 276 rotates. For example, axial flange 282 may prevent the seal 294 from separating from the aft face of the rotor disk. Similarly, axial flange 284 maintains the position of the impingement cooling channels 292 relative to the aft rotor flow discourager 248, which may be important if the peripheral portion 278 has a reduced amount of material resulting from the formation of the impingement cooling channels 292.

Accordingly, exemplary embodiments provide a turbine section 150 with improved temperature control characteristics. In general, in combination or individually, the extended radius aft seal plate 276 and the impingement cooling channels 292 may mitigate and/or protect the aft flow discourager 248 from hot gas ingestion as well as high temperatures of the mainstream gas flow. Exemplary embodiments may particularly prevent or reduce creep of the aft flow discourager 248 while not adding additional material to the rotor disk 246, turbine platform 244, and/or the aft flow discourager 248. Exemplary embodiments may also maintain the aft flow discourager 248 under centrifugal load. Exemplary embodiments may minimize the amount of air necessary to cool the gas turbine engine 100 and increase efficiency. Additionally, because of the simplicity of the design, the systems and methods disclosed herein can be readily incorporated on new design engines or it can be economically retrofitted on existing engines. The gas turbine engine assemblies produced according to exemplary embodiments may find beneficial use in many industries including aerospace, but also including industrial applications such as electricity generation, naval propulsion, pumping sets for gas and oil transmission, aircraft propulsion, automobile engines, and/or stationary power plants.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A gas turbine engine assembly, comprising:
a housing including an annular duct wall that at least partially defines a mainstream hot gas flow path configured to receive mainstream hot gas flow;
a stator assembly comprising a stator vane extending into the mainstream gas flow; and
a turbine rotor assembly upstream of the stator assembly and defining a turbine cavity with the stator assembly, the turbine rotor assembly comprising
a rotor disk having a forward side and an aft side,
a rotor platform positioned on a periphery of the rotor disk, the rotor platform defining an aft flow discourager,
a rotor blade mounted on the rotor platform extending into the mainstream gas flow, and
an aft seal plate mounted on the aft side of the rotor disk, the aft seal plate having a radius such that the aft seal plate protects the rotor platform from hot gas ingestion of the mainstream hot gas flow path into the turbine cavity, wherein the aft seal plate defines at least one cooling channel within an interior portion of the aft seal plate.

2. The gas turbine engine assembly of claim 1, wherein the aft seal plate has an outer periphery that is positioned adjacent the aft flow discourager.

3. The gas turbine engine assembly of claim 1, wherein the aft flow discourager overlaps the aft seal plate.

4. The gas turbine engine assembly of claim 1, wherein the at least one cooling channel is configured to provide cooling flow to the aft flow discourager.

5. The gas turbine engine assembly of claim 1, wherein the at least one cooling channel is configured to provide impingement cooling flow to the aft flow discourager.

6. The gas turbine engine assembly of claim 1, wherein the at least one cooling channel extends in a radial direction.

7. The gas turbine engine assembly of claim 6, wherein the rotor disk defines a disk channel configured to supply cooling flow to the at least one cooling channel.

8. The gas turbine engine assembly of claim 1, wherein the at least one cooling channel is oriented such that cooling flow strikes the aft flow discourager at about 90°.

9. The gas turbine engine assembly of claim 1, wherein the aft seal plate further includes at least one axial flange extending in an aft direction.

10. The gas turbine engine assembly of claim 6, wherein the at least one axial flange is positioned on a peripheral portion of aft seal plate.

11. A turbine assembly of a gas turbine engine assembly defining a mainstream hot gas flow path that receives mainstream hot gas flow, the assembly comprising:
a rotor disk having a forward side, an aft side, and a circumferential periphery,
a rotor platform positioned on the periphery of the rotor disk, the rotor platform defining an aft flow discourager,
a rotor blade mounted on the rotor platform extending into the mainstream gas flow, and
an aft seal plate mounted on the aft side of the rotor disk, the aft seal plate defining at least one cooling channel configured to deliver cooling flow to the aft flow discourager.

12. The turbine assembly of claim 11, wherein the at least one cooling channel is configured to provide impingement cooling flow to the aft flow discourager.

13. The turbine assembly of claim 11, wherein the at least one cooling channel extends in a radial direction.

14. The turbine assembly of claim 11, wherein the rotor disk defines a disk channel configured to supply cooling flow to the at least one cooling channel.

15. The turbine assembly of claim 11, wherein the at least one cooling channel is oriented such that cooling flow strikes the aft flow discourager at about 90°.

16. The turbine assembly of claim 11, wherein the aft seal plate further includes at least one axial flange extending in an aft direction.

17. The turbine assembly of claim 16, wherein the at least one axial flange is positioned on a peripheral portion of aft seal plate.

18. The turbine assembly of claim 16, wherein the aft seal plate has a radius such that the aft seal plate discourages hot gas ingestion from the mainstream hot gas flow path.

19. A gas turbine engine assembly, comprising:
a housing including an annular duct wall that at least partially defines a mainstream hot gas flow path configured to receive mainstream hot gas flow;
a stator assembly comprising a stator vane extending into the mainstream gas flow; and
a turbine rotor assembly upstream of the stator assembly and defining a turbine cavity with the stator assembly, the turbine rotor assembly comprising
a rotor disk having a forward side and an aft side,
a rotor platform positioned on a periphery of the rotor disk, the rotor platform defining an aft flow discourager,
a rotor blade mounted on the rotor platform extending into the mainstream gas flow, and
an aft seal plate mounted on the aft side of the rotor disk, the aft seal plate having a radius such that the aft seal plate discourages hot gas ingestion from the mainstream hot gas flow path, the aft seal plate defining at least one radially extending cooling channel configured to provide impingement cooling flow to the aft flow discourager, the aft seal plate further including at least one axial flange extending in an aft direction and positioned on a peripheral portion of aft seal plate.

20. The gas turbine engine assembly of claim 1, wherein the rotor disk includes disk passage to direct cooling air between the forward side and the aft side, and wherein the aft seal plate includes a seal between the aft seal plate and the rotor disk, the seal positioned such that the cooling air from the disk passage is directed into the at least one cooling channel.

\* \* \* \* \*